A. M. EASTMAN.
FOLDING-BEDSTEAD.
No. 171,653. Patented Jan. 4, 1876.
Fig. 1.  Fig. 4.  Fig. 2.
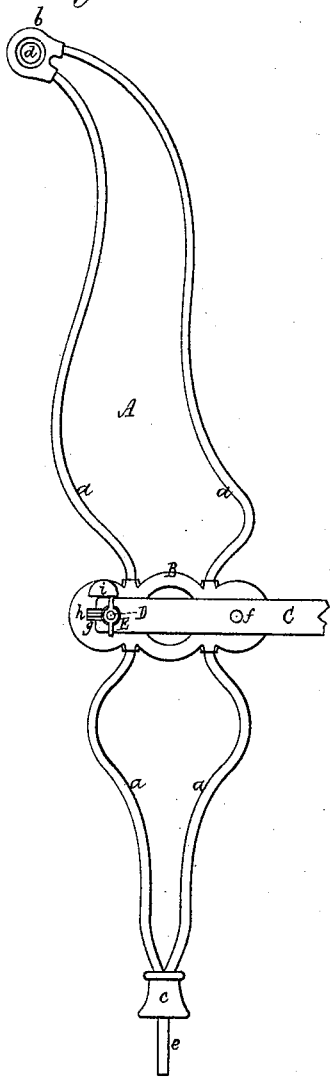
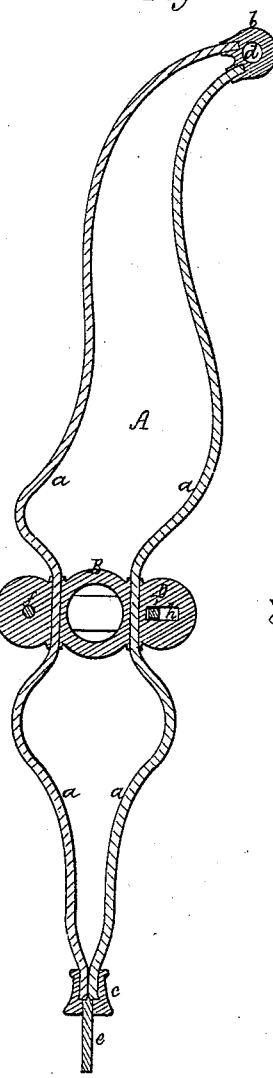
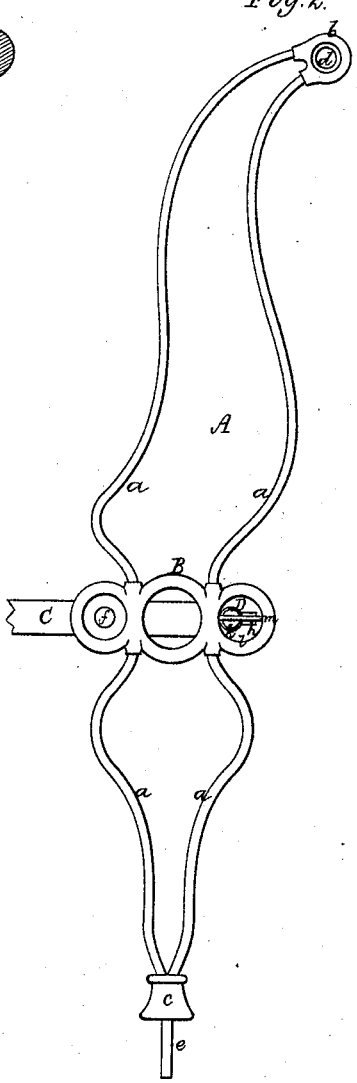
Fig. 3.
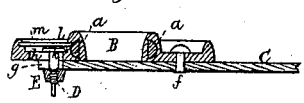
Fig. 5.
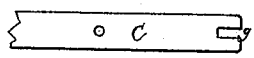
Witnesses:
S. W. Piper
L. W. Möller
Andrew M. Eastman,
by his attorney
R. H. Eddy.
N. PETERS, PHOTO-LITHOGRAPHER, WASHINGTON, D. C.

ary 4, 1876; application filed
UNITED STATES PATENT OFFICE.

ANDREW M. EASTMAN, OF SOMERVILLE, ASSIGNOR TO TUCKER MANUFACTURING COMPANY, OF BOSTON, MASSACHUSETTS.

IMPROVEMENT IN FOLDING BEDSTEADS.

Specification forming part of Letters Patent No. 171,653, dated January 4, 1876; application filed October 28, 1875.

*To all whom it may concern:*

Be it known that I, ANDREW M. EASTMAN, of Somerville, of the county of Middlesex and State of Massachusetts, have invented a new and useful Improvement in Folding Bedstead; and do hereby declare the same to be fully described in the following specification, and represented in the accompanying drawings, of which—

Figure 1 denotes an inner side elevation, Fig. 2, an outer side elevation, and Fig. 3 a transverse and horizontal section, of part of a bedstead-rail and its combined leg and post provided with my invention. Fig. 4 is a longitudinal section of the combined leg and post.

The said invention has reference to the combined foot and post, the bed-rail and their fastenings all being as hereinafter explained.

In the said drawings the combined leg and post is shown at A as composed of the wrought-iron or metal bars $a\ a$, two cast-metal end connections, $b\ c$, and an intermediate connection, B, all shaped and arranged substantially as represented.

In making the said combined leg and post the two bars $a\ a$ are to be placed in three molds for casting upon the said bars the end and intermediate connections, which, subsequently, are to be duly founded of cast-metal— as iron, for instance—they serving to hold the bars together, and with them to constitute a strong and durable combined leg and post. The upper end connection has a hole, $d$, through it to receive a rod for joining it with another such connection of the fellow-combined leg and post. The lower or foot connection may be made either with or without a caster-pivot, $e$, extended from it, as shown.

The bed-rail or a part thereof, represented at C, it is customary to construct in two pieces, jointed or hinged together at their inner ends, each part being pivoted to a combined leg and post.

In the drawings, the rail-part C is shown as notched at its outer end, and as connected to the intermediate connection B by a pivot, $f$, the notch being particularly indicated at $g$ in Fig. 5, which is a view of a portion of the bar C. The part B is furnished with a horizontal slot, $h$, and also with an abutment or stop, $i$, the latter being arranged to project from the inner surface of the part B, and serving to arrest the rail-piece C when its notch $g$ is coincident with the slot $h$, or in a position for reception of a clamp-screw, D, which is arranged in the slot and provided with a nut, E. This screw may be moved in the slot, either into or out of the notch $g$.

In order to prevent the screw from being lost or falling from the slot, the head $k$ of the screw is arranged in a chamber, $l$, made in the part B, and provided with a guard, $m$, going diametrically across the chamber, all being as shown, the guard also answering as a guide for the screw.

By having the rail-bar C furcated, and the part B slotted and provided with the guard and the screw, the latter can easily be moved either into engagement with the rail-bar C, so as to aid in locking it to the combined leg and foot, or out of engagement with such rail-bar to admit it to be turned up on its fulcrum or pivot, in order to effect the folding of the bedstead.

The mode described of making the combined leg and post is specially advantageous, and better than to form it of a single casting, as it renders the article very light and much stronger.

I claim as my invention, in a folding bedstead, as follows, viz:

1. As a new or improved manufacture, the combined leg and post A, as composed of the wrought metal bars $a\ a$, and the cast-metal end and intermediate connections $b\ B\ c$, arranged and combined substantially as set forth.

2. The combined leg and post A, as provided with the slot $h$, the guard $m$, and the headed screw D, all arranged as specified.

3. The combined leg and post A, provided with the stop $i$, slot $h$, and headed screw D, to operate with the bed-rail bar C, notched at its outer end and pivoted to the part B, all as explained.

ANDREW M. EASTMAN.

Witnesses:
R. H. EDDY,
J. R. SNOW.